United States Patent [19]

Smith

[11] 4,342,732

[45] Aug. 3, 1982

[54] SLUDGE FIXATION AND STABILIZATION

[76] Inventor: Robert H. Smith, 1402 Conshohocken Rd., Norristown, Pa. 19401

[21] Appl. No.: 169,820

[22] Filed: Jul. 17, 1980

[51] Int. Cl.³ .......................... C01B 17/00; B09B 1/00; C04B 11/00; C04B 1/00

[52] U.S. Cl. .................................... 423/242; 106/109; 106/118; 106/DIG. 1; 106/900; 405/128

[58] Field of Search .................. 106/85, 109, 97, 110, 106/117, 118, 900, DIG. 1; 405/128, 129; 423/242 A

[56] References Cited

U.S. PATENT DOCUMENTS

| | | | |
|---|---|---|---|
| 3,625,164 | 12/1971 | Spector | 423/168 |
| 3,785,840 | 1/1974 | Minnick et al. | 106/118 |
| 3,870,535 | 3/1975 | Minnick et al. | 106/118 |
| 3,897,259 | 7/1975 | Nakajima | 106/85 |
| 3,920,795 | 11/1975 | Selmeczi et al. | 106/117 |
| 4,049,462 | 9/1977 | Cocozza | 106/85 |
| 4,084,381 | 4/1978 | Cain et al. | 106/118 |
| 4,108,677 | 8/1978 | Valisa | 405/129 |
| 4,134,774 | 1/1979 | Heese et al. | 106/98 |

*Primary Examiner*—Gary P. Straub
*Attorney, Agent, or Firm*—Weiser, Stapler & Spivak

[57] ABSTRACT

The physical and chemical fixation and stabilization of waste products from a sulfur-fuel burning unit through controlled crystallization of dissolved calcium sulfite. A low pH calcium sulfite solution is added to the waste containing aqueous sludge produced by a gas desulfurization unit thereby raising the pH of the calcium sulfite to crystalize the calcium sulfite and bind and encapsulate the waste products into a solid mass.

23 Claims, No Drawings

SLUDGE FIXATION AND STABILIZATION

DESCRIPTION

1. Technical Field

The present invention relates, in general, to pollution control and, in particular, to the treatment of waste products collected from boiler units burning sulfur-containing fuel, so that these waste products may be disposed of without detrimental effects on the environment.

2. Background Art

Much effort and expense has been, and continues to be, devoted to the removal of pollutants from various sources. Boiler equipment burning sulfur-containing fuel, such as coal-fired boilers, is a main source of air pollution. Typically, electrostatic precipitators are employed with coal-fired boilers to remove the fine particulate matter known as fly ash from the stack gas and desulfurization stack gas scrubbers are used to remove sulfur oxides from the stack gas. The sulfur oxides, if permitted to escape to the atmosphere, can react with moisture in the atmosphere to yield sulfuric and sulfurous acids. In order to prevent the emission of the sulfur oxides to the atmosphere, the flue gases are scrubbed with a lime or limestone slurry. Dissolved calcium in the slurry captures the sulfur oxides by producing calcium sulfite and calcium sulfate.

While desulfurization stack gas scrubbers are effective in controlling air pollution, the scrubbing process yields a very large amount of waste sulfite and sulfate in the form of sludge. The sludge poses a considerable environmental threat; not only because of its intrinsically unstable mud-like character, but also because it contains many polluting constituents which can leach into the environment.

In order to protect the environment, and also transform the sulfite-sulfate waste into a solid material capable of providing useful bearing capacity, it is desirable to utilize a sludge fixation and stabilization process. There are a number of processes known for solidifying and encapsulating flue gas desulfurization sludge. These processes typically involve admixing a cementitious agent with the sludge so that the combined material hardens and the desired effect is achieved.

U.S. Pat. No. 3,785,840 discloses a process for sludge fixation and stabilization in which a hardenable cementitious mixture of lime, fly ash, and sulfite salts is produced. Lime and fly ash are cementitious agents when mixed together in the presence of water. This process, while effective, possesses the inherent disadvantage of requiring lime to obtain the cementing action. Lime is quite expensive, energy intensive, and frequently must be hauled long distances to an operating coal-fired boiler.

U.S. Pat. No. 3,855,391 describes a process in which sulfur dioxide scrubber waste sludge is stabilized by using plaster of paris. The scrubbing liquor is provided with a catalyst which optimizes the production of calcium sulfate by oxidation of calcium sulfite. The calcium sulfate is separated from the waste sludge and converted, by heating, to plaster of paris, which is then remixed with the sludge to stabilize the material in a landfill. This process has the disadvantage of requiring calcination of calcium sulfate with the attendant high thermal energy utilization.

U.S. Pat. No. 4,108,677 relates to a process in which the aqueous sludge developed in an aqueous alkaline desulfurization unit is stabilized to facilitate its disposal by calcining a first portion of the sludge at a temperature between 250° C. and 650° C. to eliminate volatile liquids and to convert the calcium sulfite in the sludge into a cementitious material. The calcined material then is recombined with the remainder of the sludge to produce a stabilized mixture for disposal in a landfill. This process also has the disadvantage of requiring calcination which involves high thermal energy utilization.

DISCLOSURE OF INVENTION

Accordingly, it is an objective of the present invention to provide a new and improved method for treating waste products from a sulfur-containing fuel burning unit so that these waste products may be disposed of without detrimental effects on the environment.

It is another objective of the present invention to provide a method for treating waste products from a sulfur-containing fuel burning unit which does not require the addition of expensive materials.

It is a further objective of the present invention to provide a method for treating waste products from a sulfur-containing fuel burning unit which is economical and effective in accomplishing the intended results.

The present invention is based on the finding that physical and chemical fixation and stabilization of calcium-sulfur waste products from sulfur-containing fuel burning units can be accomplished through controlled crystalization of dissolved calcium sulfite. The method of the present invention involves supplying the calcium-sulfur compound waste products and a low pH calcium sulfite solution. The calcium sulfite solution is combined with the calcium-sulfur compound waste products to raise the pH of the calcium sulfite solution and crystalize the calcium sulfite, whereby the waste products are bound and encapsulated into a solid mass.

The significance of the present invention is that the calcium sulfite, which is used to effect the fixation and stabilization of the waste products, already is present as a waste product. In contrast to the prior art methods which require the addition or treatment of materials which increase the expense of the fixation and stabilization of the waste products, the present invention utilizes one of the waste products to effect the fixation and stabilization.

BEST MODES OF CARRYING OUT THE INVENTION

Essentially, the waste produced by a sulfur-containing fuel burning unit is composed of fly ash, calcium-sulfur compounds (principally calcium sulfate and calcium sulfite), and other waste products. Typically, the fly ash is in powdered form and the remaining materials are in a sludge. In accordance with the present invention a calcium sulfite solution having a low pH is combined with the sludge to raise the pH of the calcium sulfite and crystalize the calcium sulfite, whereby the waste products in the sludge are bound and encapsulated into a solid mass. By low pH, it is meant a pH of below approximately 4.0 which is generally considered a medium level pH. Preferably, the pH of the calcium sulfite solution is approximately 2.5 or less.

The solubility of calcium sulfite in water varies with pH. Calcium sulfite is only very slightly soluble when the pH is above approximately 5.0. Below this pH value, the solubility of calcium sulfite increases rapidly.

The calcium sulfite solution having the requisite low pH level may be obtained a number of ways. One approach is to separate a predetermined portion of the sludge and dissolve the calcium sulfite in this separated portion of the sludge by use of an acidic solution. Preferably, the acid is sulfuric or sulfurous acid available from the gas desulfurization scrubber. The nature and amount of acid added to the separated calcium-sulfur compound sludge lowers the pH of the calcium sulfite in this portion of the sludge to the appropriate level. By using sulfuric or sulfurous acid which is available in the gas desulfurization scrubber, the present invention again makes use of a component available from the pollution control equipment which would otherwise go unused. The sulfuric or sulfurous acid available in the gas desulfurization scrubber eventually becomes neutralized and forms a part of the waste in the sludge.

The calcium sulfite solution having the requisite low pH value also may be derived by separating a predetermined portion of the aqueous slurry from the remainder at a stage in the gas desulfurization equipment where the calcium sulfite within the sludge has a pH lower than approximately 4.0. This condition exists at an early stage in the scrubbing process.

The low pH calcium sulfite solution is combined with the waste containing sludge. The pH of the calcium sulfite solution is caused or allowed to increase, so that the calcium sulfite crystalizes and binds and encapsulates the waste products into a solid mass. In particular, saturated, or nearly saturated, calcium sulfite solution at a pH below approximately 4.0 but preferably approximately 2.5 or less is caused to permeate into a previously deposited and compacted sludge. After permeation is complete, the pH of the sludge is caused, or allowed, to rise so that the solution becomes supersaturated with respect to calcium sulfite. When this occurs, calcium sulfite crystals form on and around the waste products to bind and encapsulate them into a permanent, structurally stable, and relatively impermeable mass. This produces an environmentally satisfactory material which prevents significant leaching and also provides useful bearing capacity.

The initial degree of compaction of the waste products and the pH level of the calcium sulfite solution determine whether more than one cycle of permeation and crystalization are desired. As crystalization takes place, the permeability of the waste mass decreases, so that longer periods of time are required for each succeeding cycle to obtain equal crystal growth.

Instead of permeating a compacted mass of sludge with the calcium sulfite solution, a saturated, or nearly saturated, calcium sulfite solution may be premixed with the wastes before the wastes are deposited on the ground and compacted. The pH of the calcium sulfite solution then is caused, or allowed, to rise so as to produce supersaturation and calcium sulfite crystallization. This is followed by compaction.

Control of the pH level to produce supersaturated conditions may be achieved either through natural means or by the use of pH increasing additives. The natural approach takes advantage of the fact that most of the other waste produced by a sulfur-containing fuel burning unit have a higher pH than the low pH calcium sulfite solution which is added to the waste containing sludge. When a low pH calcium sulfite solution is permeated into a compacted fly ash-sulfate-sulfite mixture, the mixture normally will raise the pH of the calcium sulfite solution. With the solution initially at, or near, saturation, increasing the pH will produce supersaturation so that the crystal formation and growth begin. This is not an instantaneous process but proceeds slowly according to the laws of ionic diffusion and other chemical considerations.

If it is desired to increase the rate of calcium sulfite crystal formation and growth in either the permeation or premix approaches, additives which raise pH may be employed. Among the materials which may be used for this purpose are lime and fly ash.

Ordinarily, fly ash, collected by the pollution control equipment, is combined with the sludge and is part of the mass formed during the fixation and stabilization process. However, in instances where the fly ash is sold or disposed of as a separate item or when the boiler is fired by oil rather than coal so that virtually no fly ash is produced, only the sludge waste products are part of the fixation and stabilization.

The following illustrative examples, based on laboratory experiments, will serve to illustrate the invention and the improved properties thereof.

EXAMPLE 1

Various materials were employed in this experiment in order to accurately portray the behavior of flue gas desulfurization waste materials before, during, and after chemical and physical fixation and stablization. These materials are:

Calcium Sulfite—$CaSO_3 \cdot \frac{1}{2} H_2O$
Calcium Sulfate—$CaSO_4 \cdot 2 H_2O$
Coal Fly Ash The coal fly ash was obtained from a local central electric generating station. The calcium sulfate dihydrate used was an agricultural gypsum ground to a particle size closely approximating that of the gypsum produced in a flue gas desulfurization scrubber. Calcium sulfite was produced as follows:

Sulfur dioxide gas, obtained commercially, was bubbled through a lime-water solution. The lime-water solution had been previously prepared by mixing water and high calcium lime (calcium hydroxide) together and allowing the mixture to come to equilibrium. This produced a solution which was saturated with respect to calcium. The solution was then filtered off and the undissolved lime discarded.

Bubbling sulfur dioxide through a lime-water solution produces calcium sulfite hemihydrate. In the present instance, the pH was carefully monitored and the bubbling stopped at approximately a pH of 8 after having been initiated at pH 12.5. The calcium sulfite hemihydrate was allowed to settle out and was then air dried.

A portion of the calcium sulfite obtained in this manner was thoroughly mixed with fly ash and calcium sulfate to produce a typical coal-associated waste formulation as follows:

| Constituent | Weight Percent |
| --- | --- |
| Fly Ash | 50 |
| Calcium Sulfite Hemihydrate | 35 |
| Calcium Sulfate Dihydrate | 15 |

The thoroughly mixed formulation, in a damp compactable state, was compacted in a 2½ in. diameter mold to a thickness of approximately 2 in. After compaction, a saturated calcium sulfite solution at pH 2.75 was allowed to permeate through the compacted waste mixture and stand for a 72 hour period. At that time, the pH of the solution was measured and found to be above 5.0.

Three more permeations of 72 hours each were carried out for a total of 12 days of crystal formation and growth to produce a binding fixation matrix around the coal-associated waste materials. At this time, the sample was demolded and tested in unconfined compression yielding a strength of 1.85 tons per square foot.

EXAMPLE 2

A compacted specimen of coal-associated waste material was prepared as in Example 1. In this case, a saturated calcium sulfite solution at pH 2.75 was also allowed to permeate through the waste material formulation after compaction. In this instance, however, after an initial 12 hour period of permeation, fly ash at a pH of approximately 8.0 was mixed with the calcium sulfite solution standing on top of the compacted waste to bring its pH above about 5.0.

A 12 hour period for accelerated crystal formation and growth was then provided. At the completion of this cycle, the calcium sulfite solution was discarded and three additional 24 hour permeation and crystal growth cycles were carried out.

Thus a total of four cycles over four days were used for chemical fixation of the sample. At the end of this time, the specimen was demolded and tested in unconfined compression yielding a strength of 2.05 tons per square foot.

In this example, it would not have been necessary to use fly ash in order to accelerate crystal formation and growth. Any material, alkaline or otherwise, which would increase the calcium sulfite solution pH to above about 5.0 would be effective.

EXAMPLE 3

A procedure exactly as described in Example 1 was carried out on a third specimen except that the pH of the initial saturated calcium sulfite solution was 2.0. The unconfined compression strength after four cycles (12 days) was 3.18 tons per square foot.

While in the foregoing there have been described preferred embodiments of the invention, it should be understood to those skilled in the art that various modifications and changes can be made without departing from the true spirit and scope of the invention as recited in the claims.

I claim:

1. A method of disposing of wastes from a coal burning unit having flue gas desulfurization equipment utilizing wet lime or limestone scrubbing which develops a mixture of calcium sulfite, calcium sulfate and any related coal-associated wet waste products, said method comprising:
    supplying said calcium sulfite, calcium sulfate and any related coal-associated wet waste products;
    supplying a substantially saturated calcium sulfite-calcium bisulfite solution having a pH below about 4;
    and combining said calcium sulfite-calcium bisulfite solution with said calcium sulfite, calcium sulfate and related coal-associated wet waste products to raise the pH of said calcium sulfite-calcium bisulfite solution sufficiently to precipitate and crystalize a substantial portion of the sulfite value in said solution, whereby said waste products are encapsulated into a solid mass.

2. A method according to claim 1 wherein said calcium sulfite, calcium sulfate and related coal-associated wet waste products are supplied in a sludge.

3. A method according to claim 2 wherein the step of combining said calcium sulfite—calcium bisulfite solution with said calcium sulfite, calcium sulfate and related coal-associated wet waste products to form a second mixture includes depositing the mixture on the ground and compacting the mixture so that said wastes are more easily and effectively encapsulated into a chemically bound mass by the precipitating and crystallizing calcium sulfite.

4. A method according to claim 3 wherein
    said calcium sulfite—calcium bisulfite solution is obtained from said wet lime or limestone scrubbing operation,
    said scrubbing operation comprising an early stage and a later stage, and wherein
    said flue gas to be desulfurized in contacted with said lime or limestone solution in said later stage to form said mixture of calcium sulfite, calcium sulfate and any related coal-associated wet waste products as a sludge,
    a portion of said sludge being passed to said early stage in which it is reacted with additional flue gas to be desulfurized to form a calcium bisulfite solution having a pH below about 4.

5. A method according to claim 4 wherein the pH of said calcium sulfite—calcium bisulfite solution obtained from said lime or limestone scrubbing of flue gas is approximately 2.5 or less but not so low that substantial evolution of sulfur dioxide occurs.

6. A method according to claim 2 wherein said calcium sulfite—calcium bisulfite solution is combined with said sludge after said sludge has been deposited on the ground and compacted.

7. A method according to claim 6 wherein
    said calcium sulfite—calcium bisulfite solution is obtained from said wet lime or limestone scrubbing operation,
    said scrubbing operation comprising an early stage and a later stage, and wherein
    said flue gas to be desulfurized is contacted with said lime or limestone solution in said later stage to form said mixture of calcium sulfite, calcium sulfate and any related coal-associated wet waste products as a sludge,
    a portion of said sludge being passed to said early stage in which it is reacted with additional flue gas to be desulfurized to form a calcium bisulfite solution having a pH below about 4.

8. A method according to claim 7, wherein the pH of said calcium sulfite—calcium bisulfite solution obtained from said lime or limestone scrubbing of flue gas is approximately 2.5 or less but not so low that substantial evolution of sulfur dioxide occurs.

9. A method according to claim 1 wherein the step of combining said calcium sulfite—calcium bisulfite solution with said calcium sulfite, calcium sulfate and related coal-associated wet waste products to form a second mixture includes compacting said second mixture so that the said wastes are more easily and effectively encapsulated into a chemically bound mass by the precipitating and crystallizing calcium sulfite.

10. A method according to claim 9 wherein
    said calcium sulfite—calcium bisulfite solution is obtained from said wet lime or limestone scrubbing operation, said scrubbing operation comprising an early stage and a later stage, and wherein said flue gas to be desulfurized is contacted with said lime or limestone solution in said later stage to form said mixture of calcium sulfite, calcium sulfate and any related coal-associated wet waste products as a sludge, a portion of said sludge being passed to said early stage in which it is reacted with additional flue gas to be desulfurized to form a calcium bisulfite solution having a pH below about 4.

11. A method according to claim 10 wherein the pH of said calcium sulfite—calcium bisulfite solution obtained from said lime or limestone scrubbing of flue gas is approximately 2.5 or less but not so low that substantial evolution of sulfur dioxide occurs.

12. A method according to claim 1 wherein said calcium sulfite—calcium bisulfite solution is supplied in an amount sufficient to produce a standing layer of said solution above and in contact with the said calcium sulfite, calcium sulfate and related coal-associated wet waste products, calcium sulfite—calcium bisulfite mixture; said method comprising:

supplying a material having a pH above about 5 to said solution to raise the pH thereof and accelerate the rate of precipitation and crystalization of at least a substantial portion of the sulfite value in said solution above the rate which would otherwise exist without the addition of said material having a pH above about 5.

13. A method according to claim 12 wherein said material having a pH above about 5 to fly ash produced on-site.

14. A method according to claim 12 wherein said material having a pH above about 5 is lime.

15. A method according to claim 12 wherein said material having a pH above about 5 is limestone.

16. A method of disposing of wastes from a coal burning unit having flue gas desulfurization equipment utilizing wet lime or limestone scrubbing which develops a mixture of calcium sulfite, calcium sulfate and related waste products and having equipment for separate and dry collection of fly ash, said method comprising:

supplying said fly ash;

supplying said calcium sulfite, calcium sulfate and related waste products;

supplying a substantially saturated calcium sulfite—calcium bisulfite solution having a pH below about 4;

and combining said calcium sulfite—calcium bisulfite solution with said dry-collected fly ash and said calcium sulfite, calcium sulfate and related waste products to raise the pH of said solution to precipitate and crystalize said calcium sulfite, whereby said fly ash and said waste products are encapsulated into a solid mass.

17. A method according to claim 16 wherein said calcium sulfite, calcium sulfate and related waste products are supplied in a sludge.

18. A method according to claim 17 wherein the step of combining said calcium sulfate—calcium bisulfite solution obtained from said lime or limestone scrubbing of flue gas with said fly ash and said calcium sulfite, calcium sulfate and related waste products includes compacting the mixture.

19. A method according to claim 17 wherein said calcium sulfite—calcium bisulfite solution is combined with said fly ash and said sludge after said fly ash and said sludge have been mixed and the mixture has been compacted.

20. A method according to claim 19 wherein said calcium sulfite—calcium bisulfite solution is obtained from said wet lime or limestone scrubbing operation, said scrubbing operation comprising an early stage and a later stage, and wherein said flue gas to be desulfurized is contacted with said lime or limestone solution in said later stage to form said mixture of calcium sulfite, calcium sulfate and any related coal-associated wet waste products as a sludge, a portion of said sludge being passed to said early stage in which it is reacted with additional flue gas to be desulfurized to form a calcium bisulfite solution having a pH below about 4.

21. A method according to claim 16 wherein the step of combining said calcium sulfite—calcium bisulfite solution obtained from said lime or limestone scrubbing of flue gas with said fly ash and said calcium sulfite, calcium sulfate and related waste products includes compacting the mixture.

22. A method according to claim 21 wherein said calcium sulfite—calcium bisulfite solution is obtained from said wet lime or limestone scrubbing operation, said scrubbing operation comprising an early stage and a later stage, and wherein said flue gas to be desulfurized is contacted with said lime or limestone solution in said later stage to form said mixture of calcium sulfite, calcium sulfate and any related coal-associated wet waste products as a sludge, a portion of said sludge being passed to said early stage in which it is reacted with additional flue gas to be desulfurized to form a calcium bisulfite solution having a pH below about 4.

23. A method according to claim 22 wherein the pH of said calcium sulfite—calcium bisulfite solution is approximately 2.5 or less but not so low that evolution of sulfure dioxide removes sufficient calcium sulfite from the solution to prevent effective precipitation and crystalization of calcium sulfite as said encapsulating and chemical binding agent.

* * * * *

UNITED STATES PATENT AND TRADEMARK OFFICE
CERTIFICATE OF CORRECTION

PATENT NO. : 4,342,732
DATED : August 3, 1982
INVENTOR(S) : ROBERT H. SMITH

It is certified that error appears in the above—identified patent and that said Letters Patent is hereby corrected as shown below:

In Claim 13, line 33, cancel "to" and substitute --is--.

In References Cited, cancel "Valisa" and substitute --Valiga--.

Signed and Sealed this

Sixteenth Day of November 1982

[SEAL]

Attest:

GERALD J. MOSSINGHOFF

Attesting Officer        Commissioner of Patents and Trademarks